(12) United States Patent
Liu et al.

(10) Patent No.: US 8,654,763 B2
(45) Date of Patent: Feb. 18, 2014

(54) SYSTEMATIC APPROACH TOWARDS MINIMIZING PACKET CLASSIFIERS

(75) Inventors: Xiang-Yang Alexander Liu, Okemos, MI (US); Chad R. Meiners, East Lansing, MI (US); Eric Torng, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 663 days.

(21) Appl. No.: 12/578,824

(22) Filed: Oct. 14, 2009

(65) Prior Publication Data

US 2010/0118871 A1 May 13, 2010

Related U.S. Application Data

(60) Provisional application No. 61/105,578, filed on Oct. 15, 2008.

(51) Int. Cl.
*H04L 12/28* (2006.01)

(52) U.S. Cl.
USPC .............. 370/389; 709/220; 709/241; 726/1; 726/3

(58) Field of Classification Search
None
See application file for complete search history.

(56) References Cited

U.S. PATENT DOCUMENTS

| 6,385,649 | B1 | 5/2002 | Draves et al. | |
|---|---|---|---|---|
| 2006/0277601 | A1* | 12/2006 | Gouda et al. | 726/11 |
| 2007/0016946 | A1* | 1/2007 | Gouda et al. | 726/11 |

OTHER PUBLICATIONS

A whitepaper Titled Firewall Policy Queries, Gouda et al, Dec. 31, 2008.*
A whitepaper titled complete redundancy detection in firewalls, Gouda et al., 2006.*
A Whitepaper titled Cost bounded binary decision diagrams for 0-1 programming, Hadzic et al, 2007.*
Postoptimality analysis for integer programming using binary decision diagram, Hooker et al, Apr. 1, 2008.*
Learning decision trees from decision rules: a method and initial results from a comparative study, Michalski et al, 1993.*
All match based complete redundacy removal for packet classifiers in TCAMS, Zhou et al., Apr. 2008.*
Firewall policy verification and troubleshooting, lie, Feb. 23, 2008.*
Cost minimization in redundant trees for protection in vertex redundant or edge redundant graphs, Xue et al., 2002.*
Q. Dong et al "Packet Classifiers in Ternary CAMS Can Be Smaller", Sigmetrics/Performance '06, Jun. 26-30, 2006.

* cited by examiner

*Primary Examiner* — Brian Roberts
(74) *Attorney, Agent, or Firm* — Harness, Dickey & Pierce, P.L.C.

(57) ABSTRACT

A method is provided for constructing a packet classifier for a computer network system. The method includes: representing a set of rules for packet classification as a directed graph; formulating a plurality of minimization problems from the directed graph, where subgraphs extending from non-terminal nodes in the directed graph represent a minimization problem (i.e., a one-dimensional packet classifier); solving the plurality of minimization problems; combining solutions for the plurality of minimization problems to yield a reduced set of rules which form a reduced packet classifier; and instantiating the reduced packet classifier in a content-addressable memory device.

16 Claims, 7 Drawing Sheets

(a) Before FDD reduction  (b) After FDD reduction

SYSTEMATIC APPROACH TOWARDS MINIMIZING PACKET CLASSIFIERS

CROSS-REFERENCE TO RELATED APPLICATIONS

This application claims the benefit of U.S. Provisional Application No. 61/105,578, filed on Oct. 15, 2008. The entire disclosure of the above application is incorporated herein by reference.

FIELD

The present disclosure relates to a systematic approach towards minimizing packet classifiers.

BACKGROUND

Packet classification, which is widely used on the Internet, is the core mechanism that enables routers to perform many networking services such as firewall packet filtering, virtual private networks (VPNs), network address translation (NAT), quality of service (QoS), load balancing, traffic accounting and monitoring, differentiated services (Diffserv), etc. As more services are deployed on the Internet, packet classification grows in demand and importance.

The function of a packet classification system is to map each packet to a decision (i.e., action) according to a sequence (i.e., order list) of rules, which is called a packet classifier. Each rule in a packet classifier has a predicate over some packet header fields and a decision to be performed upon the packets that match the predicate. To resolve possible conflicts among rules in a classifier, the decision for each packet is the decision of the first (i.e., highest priority) rule that the packet matches. Table 1 below shows an example packet classifier of two rules. The format of these rules is based upon the format used in Access Control Lists on Cisco routers.

TABLE 1

| Rule | Source IP | Destination IP | Source Port | Destination Port | Protocol | Action |
|---|---|---|---|---|---|---|
| $r_1$ | 1.2.3.0/24 | 192.168.0.1 | [1,65534] | [1,65534] | TCP | accept |
| $r_2$ | * | * | * | * | * | discard |

To process the never-ending supply of packets at wire speed, using Ternary Content Addressable Memories (TCAMs) to perform packet classification has become the de facto standard for high-speed routers on the Internet. A TCAM is a memory chip where each entry can store a packet classification rule that is encoded in ternary format. Given a packet, the TCAM hardware can compare the packet with all stored rules in parallel and then return the decision of the first rule that the packet matches. Thus, it takes O (1) time to find the decision for any given packet. In 2003, most packet classification devices shipped were TCAM-based. More than 6 million TCAM devices were deployed worldwide in 2004.

Despite their high speed, TCAMs have their own limitations with respect to packet classification. TCAMs can only store rules that are encoded in ternary format. In a typical packet classification rule, source IP address, destination IP address, and protocol type are specified in prefix format, which need to be converted to one or more prefixes before being stored in TCAMs. This can lead to a significant increase in the number of TCAM entries needed to encode a rule. For example, 30 prefixes are needed to represent the single range [1,65534], so 30×30=900 TCAM entries are required to represent the single rule ($r_1$) in Table 1.

TCAMs have limited capacity. The largest TCAM chip available on the market has 18 Mb while 2 Mb and 1 Mb chips are most popular. Given that each TCAM entry has 144 bits and a packet classification rule may have a worst expansion factor of 900, it is possible that an 18 Mb TCAM chip cannot store all the required entries for a modest packet classifier of only 139 rules. While the worst case may not happen in reality, this is certainly an alarming issue. Furthermore, TCAM capacity is not expected to increase dramatically in the near future due to other limitations that we will discuss next.

TCAM chips also consume large amounts of power and generate large amounts of heat. For example, a 1 Mb TCAM chip consumes 15-30 watts of power. Power consumption together with the consequent heat generation is a serious problem for core routers and other networking devices.

TCAMs occupy much more board space than SRAMs. For networking devices such as routers, area efficiency of the circuit board is a critical issue.

TCAMs are expensive. For example, a 1 Mb TCAM chip costs about 200~250 U.S. dollars. TCAM cost is a significant fraction of router cost.

This section provides background information related to the present disclosure which is not necessarily prior art.

SUMMARY

A method is provided for constructing a packet classifier for a computer network system. The method includes: representing a set of rules for packet classification as a directed graph; formulating a plurality of minimization problems from the directed graph, where subgraphs extending from non-terminal nodes in the directed graph represent a minimization problem (i.e., a one-dimensional packet classifier); solving the plurality of minimization problems; combining solutions for the plurality of minimization problems to yield a reduced set of rules which form a reduced packet classifier; and instantiating the reduced packet classifier in a content-addressable memory device.

Further areas of applicability will become apparent from the description provided herein. The description and specific examples in this summary are intended for purposes of illustration only and are not intended to limit the scope of the present disclosure.

DRAWINGS

Figure 13:
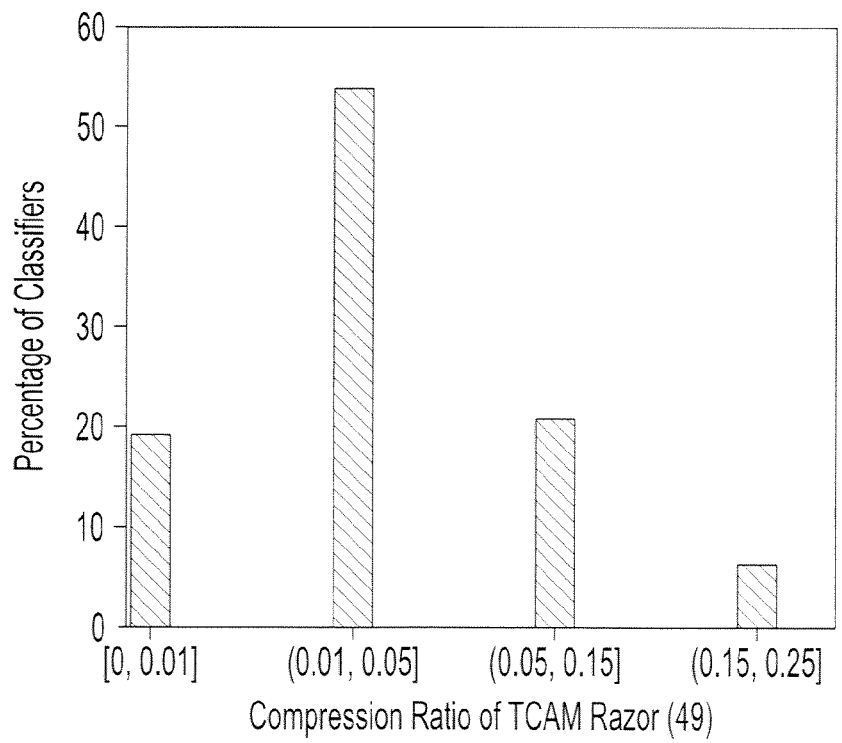
Figure 14:
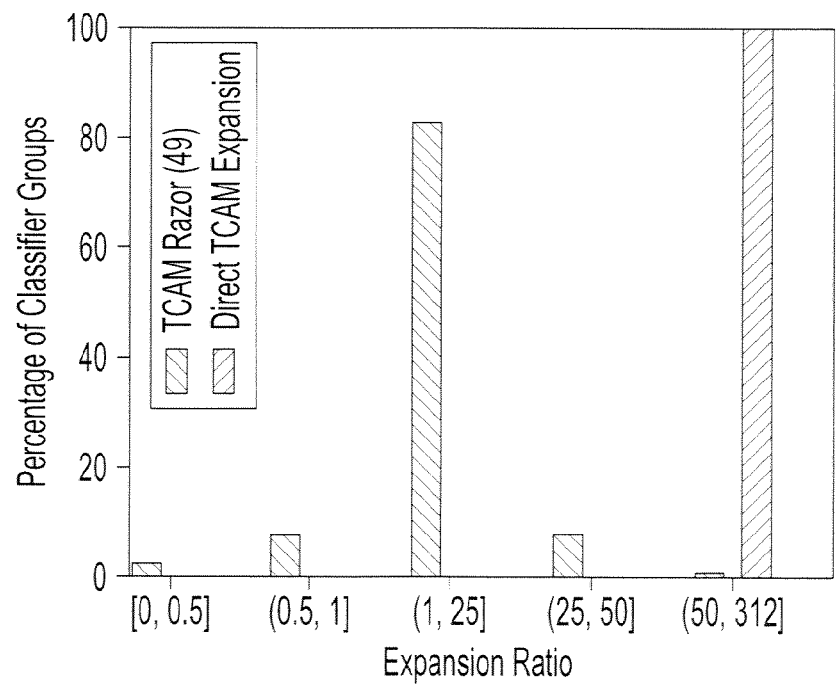

FIG. 13 is a chart illustrating distribution of synthetic packet classifiers by compression ratio; and FIG. 14 is a chart illustrating distribution of synthetic packet classifiers by compression ratio The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Given a packet classifier, how can we generate another semantically equivalent packet classifier that requires the least number of TCAM entries? Two packet classifiers are (semantically) equivalent if and only if they have the same decision for every packet. For example, the two packets classifiers in Tables 1 and 2 are equivalent; however, the one in Table 1 requires 900 TCAM entries, and the one in Table 2 requires only 6 TCAM entries.

TABLE 2

| Rule | Source IP | Destination IP | Source Port | Destination Port | Protocol | Action |
|---|---|---|---|---|---|---|
| $r_1$ | 1.2.3.0/24 | 192.168.0.1 | 0 | * | * | discard |
| $r_2$ | 1.2.3.0/24 | 192.168.0.1 | 65535 | * | * | discard |
| $r_3$ | 1.2.3.0/24 | 192.168.0.1 | * | 0 | * | discard |
| $r_4$ | 1.2.3.0/24 | 192.168.0.1 | * | 65535 | * | discard |
| $r_5$ | 1.2.3.0/24 | 192.168.0.1 | [0.65535] | [0.65535] | TCP | accept |
| $r_6$ | * | * | * | * | * | discard |

Solving this problem helps to address the limitations of TCAMs. As we reduce the number of TCAM entries required, we can use smaller TCAMs, which results in less board space and lower hardware cost. Furthermore, reducing the number of rules in a TCAM directly reduces power consumption and heat generation because the energy consumed by a TCAM grows linearly with the number of ternary rules in stores. While reference is made throughout this disclosure to ternary content addressable memory (TCAM), concepts disclosed herein are applicable to other types of content addressable memory, random access memory or combinations thereof.

Figure 1:
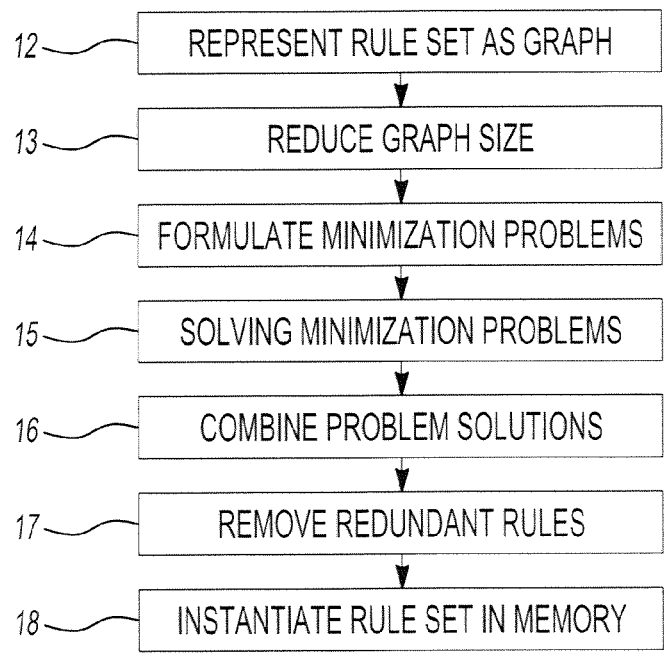
FIG. 1 is a flowchart of an exemplary method for constructing a packet classifier in accordance with this disclosure.

FIG. 1 illustrates an exemplary method for constructing a packet classifier in accordance with this disclosure (also referred to herein as "TCAM Razor"). First, a given packet classifier is converted at 12 to a decision diagram which is the canonical representation of the semantics of the given packet classifier. The size of the decision diagram may be optionally reduced as indicated at 13. For every non-terminal node is the decision diagram, minimize the number of prefixes associated with its outgoing edges. To do so, a plurality of minimization problems are formulated from the decision diagram at 14, where subgraphs extending from non-terminal nodes in the decision diagram represent a minimization problem (i.e., a one-dimensional packet classifier). The minimization problems are then solved at 15 using dynamic programming. Combining solutions from the minimization problems at 16 yields rules for a reduced packet classifier. The redundant rules are preferably removed at 17 from the reduced packet classifier. Lastly, the rule set which forms the reduced packet classifier is instantiated at 18 in a content-addressable memory device. By way of example, applying this methodology on the packet classifier in Table 1 will yield the packet classifier in Table 2.

This methodology is effective, efficient and practical. In terms of effectiveness, the methodology achieves a total compression ratio of 3.9% on real-life packet classifiers, which is significantly better than the previously published best result of 54%. In terms of efficiency, the methodology runs in seconds, even for large packet classifiers. Finally, in terms of practicality, the methodology can be easily deployed as it does not require any modification of existing packet classification systems. In comparison, a number of previous solutions require hardware and architecture modifications to existing packet classification systems, making their adoption by networking manufacturers and ISPs much less likely.

The minimization problem as well as the associated concepts of fields, packets, and packet classifiers are defined as follows. A field $F_i$ is a variable of finite length (i.e., of a finite number of bits). The domain of field $F_i$ of w bits, denoted $D(F_i)$, is $[0, 2^w-1]$. A packet over the d fields, $F_1 \ldots, F_d$ is a d-tuple $(p_1, \ldots, p_d)$, where each $p_i$ ($1 \leq i \leq d$) is an element of $D(F_i)$. Packet classifiers usually check the following five fields: source IP address, destination IP address, source port number, destination port number, and protocol type. The length of these packet fields are 32, 32, 16, 16 and 8 respectively. $\Sigma$ is used to denote the set of all packets over fields $F_1 \ldots, F_d$. It follows that $\Sigma$ is an finite set and $|\Sigma| = |D(F_1)| \times \ldots \times |D(F_i)|$ denotes the number of elements in set $D(F_i)$. It is readily understood that packet classifiers may be constructed with more or less fields as well as different fields A rule has the form $\langle$ predicate $\rangle \rightarrow \langle$ decision $\rangle$. A $\langle$ predicate $\rangle$ defines a set of packets over the fields $F_1$ through $F_d$, and is specified as $F_1 \in S_1 \wedge \ldots \wedge F_d \in S_d$, where each $S_i$ is a subset of $D(F_1)$ and is specified as either a prefix or a range. A prefix $\{0,1\}^k\{*\}^{w-k}$ with k leading 0s or 1s for a packet field of length w denotes the range $[\{0,1\}^k\{0\}^{w-k}, \{0,1\}^k\{1\}^{w-k}]$. For example, prefix 01** denotes the range [0100,0111]. A rule $F_1 \in S_1 \wedge \ldots \wedge F_d \in S_d \rightarrow \langle$ decision $\rangle$ is a prefix rule if and only if each $S_i$ is represented as a prefix.

When using a TCAM to implement a packet classifier, we typically require that all rules be prefix rules. However, in a typical packet classifier rule, some fields such as source and destination port numbers are represented as ranges rather than prefixes. This leads to range expansion, the process of converting a rule that may have fields represented as ranges into one or more prefix rules. In range expansion, each field of a rule is first expanded separately. The goal is to find a minimum set of prefixes such that the union of the prefixes corresponds to the range. For example, if one 3-bit field of a rule is the range [1, 6], a corresponding minimum set of prefixes would be 001, 01*, 10*, 110. The worst-case range expansion of a w-bit range results in a set containing 2w−2 prefixes. The next step is to compute the cross product of each set of prefixes for each field, resulting in a potentially large number of prefix rules. The range expansion of rule $r_1$ in Table 1 resulted in 30×30=900 prefix rules.

A packet $(p_1, \ldots, p_d)$ matches a predicate $F_1 \in S_1 \wedge \ldots \wedge F_d \in S_d$ and the corresponding rule if and only if the condition $p_1 \in S_1 \wedge \ldots \wedge p_d \in S_d$ holds. We use a to denote the set of possible values that ⟨decision⟩ can be. For firewalls, typical elements of a include accept, discard, accept with logging, and discard with logging.

A sequence of rules $\langle r_1, \ldots, r_n \rangle$ is complete if and only if for any packet p, there is at least one rule in the sequence that p matches. To ensure that a sequence of rules is complete and thus is a packet classifier, the predicate of the last rule is usually specified as $F_1 \in D(F_1) \wedge \ldots \wedge F_d \in D(F_d)$. A packet classifier f is a sequence of rules that is complete. The size of f denoted |f|, is the number of rules in f. A packet classifier f is a prefix classifier if and only if every rule in f is a prefix rule.

Two rules in a packet classifier may overlap; that is, there exists at least one packet that matches both rules. Furthermore, two rules in a packet classifier may conflict; that is, the two rules not only overlap but also have different decisions. Packet classifiers typically resolve conflicts by employing a first match resolution strategy where the decision for a packet p is the decision of the first (i.e., highest priority) rule that p matches in f. The decision that packet classifier f makes for packet p is denoted f(p).

A packet classifier f can be thought of as defining a many-to-one mapping function from $\Sigma$ to $\alpha$, where $\Sigma$ denotes the set of all possible packets and a denotes the set of all possible decisions. Two packet classifiers $f_1$ and $f_2$ are equivalent, denoted $f_1 \equiv f_2$, if and only if they define the same mapping function from $\Sigma$ to $\alpha$; that is, for any packet $p \in \Sigma$, we have $f_1(p) = f_2(p)$. For any packet classifier f, we use {f} to denote the set of packet classifiers that are equivalent to f.

The TCAM minimization problem can now be defined as follows. Given a packet classifier $f_1$, find a prefix packet classifier $f_2 \in \{f_1\}$ such that for any prefix packet classifier $f \in \{f_1\}$ the condition $|f_2| \leq |f|$ holds.

The special problem of a weighted one-dimensional TCAM minimization is considered first. The solution to this problem will serve as a building block for multi-dimensional TCAM minimization. Given a one-dimensional packet classifier f of n prefix rules $\langle r_1, r_2, \ldots, r_n \rangle$, where $\{\text{Decision}(r_1), \text{Decision}(r_2), \ldots, \text{Decision}(r_n)\} = \{d_1, d_2, \ldots d_z\}$ and each decision $d_i$ is associated with a cost Cost $(d_i)$ (for $1 \leq i \leq z$), we define the cost of packet classifier as follows:

$$\text{Cost}(f) = \sum_{i=1}^{n} \text{Cost}(\text{Decision}(r_i))$$

Based upon the above definition, the problem of weighted one-dimensional TCAM minimization is stated as follows.

Given a one-dimensional packet classifier $f_1$ where each decision is associated with a cost, find a prefix packet classifier $f_2 \in \{f_1\}$ such that for any prefix packet classifier $f \in \{f_1\}$, the condition $\text{Cost}(f_2) \leq \text{Cost}(f)$ holds. The problem of one-dimensional TCAM minimization (with uniform cost) has been studied in the context of compressing routing tables (e.g., see, S. Suri, T. Sandholm, and P. Warkhede, Compressing two-dimensional routing tables. Algorithmica, 35:287-300, 2003). In this disclosure, a dynamic programming solution is extended to solve the weighted one-dimensional TCAM minimization.

Three observations led to the solution:
1) For any one-dimensional packet classifier f on $\{*\}^w$, we can always change the predicate of the last rule to be $\{*\}^w$ without changing the semantics of the packet classifier. This follows from the completeness property of packet classifiers.
2) Consider any one-dimensional packet classifier f on $\{*\}^w$. Let f' be f appended with rule $\{*\}^w \to d$, where d can be any decision. The observation is that $f \equiv f'$. This is because the new rule is redundant in f' since f must be complete. A rule in a packet classifier is redundant if and only if removing the rule from the packet classifier does not change the semantics of the packet classifier.
3) For any prefix $P \in \{0, 1\}^k \{*\}^{w-k}$ ($0 \leq k \leq w$), one and only one of the following conditions holds:

$$P \in \{0, 1\}^k 0 \{*\}^{w-k-1}, \quad \text{a)}$$

$$P \in \{0, 1\}^k 1 \{*\}^{w-k-1}, \quad \text{b)}$$

$$P = \{0, 1\}^k \{*\}^{w-k}. \quad \text{c)}$$

This property allows us to divide a problem on $\{0, 1\}^k \{*\}^{w-k}$ into two sub-problems: one on $\{0, 1\}^k 0 \{*\}^{w-k-1}$, and the other one on $\{0, 1\}^k 1 \{*\}^{w-k-1}$. This divide-and-conquer strategy can be applied recursively.

Based on the above three observations, an optimal dynamic programming solution is formulated for solving the weighted one-dimensional TCAM minimization problem. Let P denote a prefix $\{0, 1\}^k \{*\}^{w-k}$. P is used to denote the prefix $\{0, 1\}^k 0 \{*\}^{w-k-1}$, and $\overline{P}$ to denote the prefix $\{0, 1\}^k 1 \{*\}^{w-k-1}$. Given a one-dimensional packet classifier f on $\{*\}^w$, fp is used to denote a packet classifier on P such that for any $x \in P$, fP(x)=f(x), and $$f\frac{d}{P}$$

is used to denote a similar packet classifier on P with the additional restriction that the final decision is d. C(fp) is used to denote the minimum cost of a packet classifier t that is equivalent to fp, and $$C\left(f\frac{d}{P}\right)$$

is used to denote the minimum cost of a packet classifier t' that is equivalent to fp and the decision of the last rule in t' is d.

Given a one-dimensional packet classifier f on $\{*\}^w$ and a prefix where $P \subseteq \{*\}^w$, f is consistent on P if and only if $\forall x, y \in P$, f(x)=f(y). The proposed dynamic programming solution to the weighted one-dimensional TCAM minimization problem is based on the following theorem. The proof of the theorem shows how to divide a problem into sub-problems and how to combine solutions to the sub-problems into a solution to the original problem.

Given a one-dimensional packet classifier f on $\{*\}^w$, a prefix P where $P \subseteq \{*\}^w$, the set of all possible decisions $\{d_1, d_2, \ldots, d_z\}$ where each decision $d_i$ has a cost $w_{d_i}$ ($1 \leq i \leq z$), we have that $$C(fp) = \min_{i=1}^{z} C(f_P^{d_i})$$

Where each $C(f_P^{d_i})$ is calculated as follows:
(1) If f is consistent on P, then $$C(f_P^{d_i}) = \begin{cases} w_{f(x)} & \text{if } f(x) = d_i \\ w_{f(x)} + w_{d_i} & \text{if } f(x) \neq d_i \end{cases}$$

(2) If f is not consistent on P, then $$C(f_P^{d_i}) = \min \begin{cases} C(f_{\overline{P}}^{d_i}) + C(f_{\overline{P}}^{d_i}) - w_{d_1} + w_{d_i}, \\ \ldots, \\ C(f_{\overline{P}}^{d_{i-1}}) + C(f_{\overline{P}}^{d_{i-1}}) - w_{d_{i-1}} + w_{d_i}, \\ C(f_{\overline{P}}^{d_i}) + C(f_{\overline{P}}^{d_i}) - w_{d_i}, \\ C(f_{\overline{P}}^{d_{i+1}}) + C(f_{\overline{P}}^{d_{i+1}}) - w_{d_{i+1}} + w_{d_i}, \\ \ldots, \\ C(f_{\overline{P}}^{d_z}) + C(f_{\overline{P}}^{d_z}) - w_{d_a} + w_{d_i} \end{cases}$$

Proof for this theorem is as follows. The base case of the recursion is when f is consistent on P. In this case, the minimum cost prefix packet classifier in $\{f_P\}$ is clearly $\langle P \rightarrow f(x) \rangle$, and the cost of this packet classifier is $w_{f(x)}$. Furthermore, for $d_i \neq f(x)$, the minimum cost prefix packet classifier in $\{f_P\}$ with decision $d_i$ in the last rule is $\langle P \rightarrow f(x), P \rightarrow d_i \rangle$, where the second rule is redundant. The cost of this packet classifier is $w_{f(x)} + w_{d_i}$.

If f is not consistent on P, divide P into $\underline{P}$ and $\overline{P}$. The key observation is that an optimal solution $f^*$ to $\{f_P\}$ is essentially an optimal solution $f_1$ to the sub-problem of minimizing $f_{\underline{P}}$ appended with an optimal solution $f_2$ to the sub-problem of minimizing $f_{\overline{P}}$. The only interaction that can occur between $f_1$ and $f_2$ is if their final rules have the same decision, in which case both final rules can be replaced with one final rule covering all of P with the same decision. Let $d_x$ be the decision of the last rule in $f_1$ and $d_y$ be the decision of the last rule in $f_2$. Then compose $f^*$ whose last rule has decision $d_i$ from $f_1$ and $f_2$ based on the following cases:

(A) $d_x = d_y = d_i$: In this case, f can be constructed by listing all the rules in $f_1$ except the last rule, followed by all the rules in $f_2$ except the last rule, and then the last rule $P \rightarrow d_i$. Thus, $\text{Cost}(f) = \text{Cost}(f_1) + \text{Cost}(f_2) - w_{d_i}$.

(B) $d_x = d_y \neq d_i$: In this case, f can be constructed by listing all the rules in $f_1$ except the last rule, followed by all the rules in $f_2$ except the last rule, and then the last rule, then $P \rightarrow d_x$, and finally rule $P \rightarrow d_i$. Thus, $$\text{Cost}(f) = \text{Cost}(f_1) + \text{Cost}(f_2) - w_{d_x} + w_{d_i}.$$

(C) $d_x \neq d_y$, $d_x = d_i$, $d_y \neq d_i$: this case does not need to be considered because $$C\left(f\frac{d_i}{\underline{P}}\right) + C\left(f\frac{d_y}{\overline{P}}\right) = C\left(f\frac{d_i}{\underline{P}}\right) + C\left(f\frac{d_y}{\overline{P}}\right) + w_{d_i}) - w_{d_i} \geq$$

$$C\left(f\frac{d_i}{\underline{P}}\right) + C\left(f\frac{d_i}{\overline{P}}\right) - w_{d_i}.$$

(D) $d_x \neq d_y$, $d_x \neq d_i$, $d_y = d_i$: Similarly, this case is not considered.

(E) $d_x \neq d_y$, $d_x \neq d_i$, $d_y \neq d_i$: Similarly, this case is not considered.

Figure 2A:
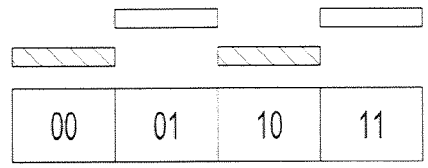
FIGS. 2A and 2B are diagrams of an exemplary one-dimensional minimization problem and an illustration of how dynamic programming work in relation to this problem.
Figure 2B:
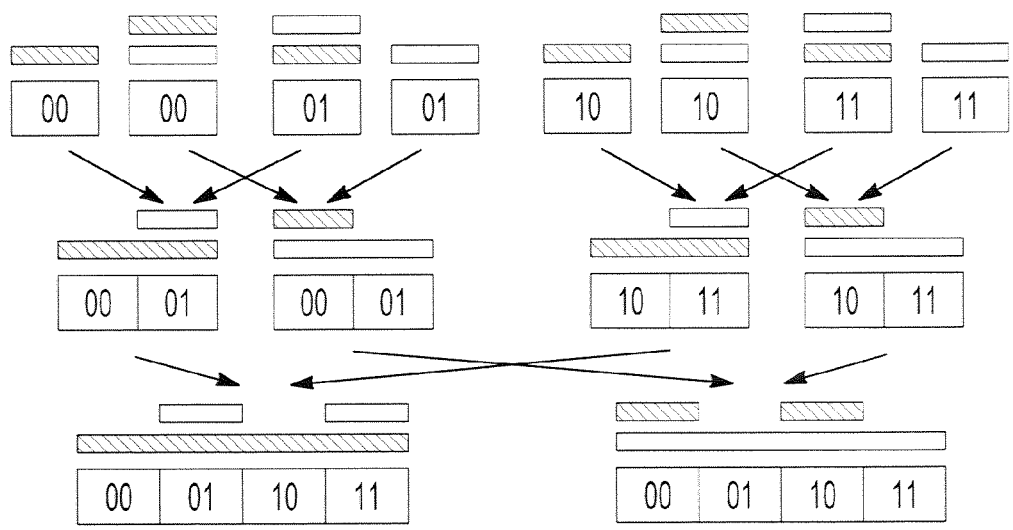

FIG. 2A illustrates a one-dimensional TCAM minimization problem, where the black bar denotes decision "accept" and the white bar denotes decision "discard". FIG. 2B illustrates how the dynamic programming solution works on this example.

A more detailed description of the methodology for minimizing multi-dimensional prefix packet classifiers is now set forth. A key idea behind this method is processing one dimension at a time using the weighted one-dimensional TCAM minimization algorithm described above to greedily identify a local minimum for the current dimension. Although the method is not guaranteed to achieve a global minimum across all dimensions, it does significantly reduce the number of prefix rules in actual packet classifiers.

To facilitate processing a packet classifier one dimension at a time, a given packet classifier is first converted to a directed graph, such as an equivalent Firewall Decision Diagram (FDD). A Firewall Decision Diagram (FDD) with a decision set DS and over fields $F_1, \ldots, F_d$ is an acyclic and directed graph that has the following five properties:

1) There is exactly one node that has no incoming edges. This node is called the root. The nodes that have no outgoing edges are called terminal nodes.
2) Each node v has a label, denoted F(v), such that $$F(v) \in \begin{cases} \{F_1, \ldots, F_d\} & \text{if } v \text{ is a nonterminal node.} \\ DS & \text{if } v \text{ is a terminal node.} \end{cases}$$

3) Each edge $e: u \rightarrow v$ is labeled with a nonempty set of integers, denoted I(e), where I(e) is a subset of the domain of u's label (i.e., $I(e) \subseteq D(F(u))$).
4) A directed path from the root to a terminal node is called a decision path. No two nodes on a decision path have the same label.
5) The set of all outgoing edges of a node v, denoted E(v), satisfies the following two conditions:

Consistency: $I(e) \cap I(e') = \emptyset$ for any two distinct edges e and e' in E(v).     a)

Completeness: $\cup_{e \in E(v)} I(e) = D(F(v))$.     b)

Further information regard FDDs can be found in "Structure Firewall Design" by M. G. Gouda and A. X. Liu, Computer Networks Journal, 51(4):1106-1120, March 2007 which is incorporated by reference herein. However, other types of graphs or decision diagrams are contemplated by this disclosure.

Figure 3:
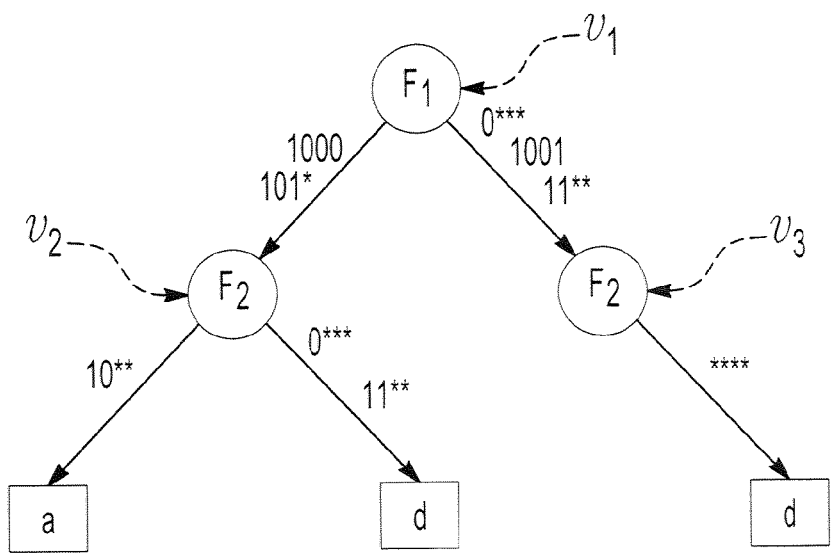
FIG. 3 is a diagram of an exemplary firewall decision diagram.

FIG. 3 shows an example FDD over two fields $F_1$, $F_2$, where the domain of each field is [0, 15]. Note that in labeling terminal nodes, letter "a" is used as a shorthand for "accept" and letter 'V' as a shorthand for "discard". Given a packet classifier an equivalent FDD $f_2$ may be constructed using the FDD construction algorithm described by X. Liu and M. G.

Gouda in "Diverse firewall design", In Proceedings of the International Conference on Dependable Systems and Networks (DSN-04), pages 595-604, June 2004. Alternatively, an improved FDD construction algorithm is also presented below. It is envisioned that other types of construction algorithms can be used in the methodology.

With reference to FIG. 3, a plurality of minimization problems are formulated from the directed graph, where subgraphs extending from non-terminal nodes in the graph represent minimization problems. The graph is traversed in a bottom up manner from the leaf nodes to a root node. Thus, the subgraph rooted at node $v_2$ serves as the first minimization problem. This subgraph can be seen as representing a one dimension packet classifier over field $F_2$. The weighted one-dimensional TCAM minimization algorithm described above can be used to minimize the number of prefix rules for this one-dimensional packet classifier. The algorithm takes the following 3 prefixes as input:

10 * * (with decision accept and cost 1),
0 * ** (with decision discard and cost 1),
11 * * (with decision discard and cost 1).

The one-dimensional TCAM minimization algorithm will produce a minimum (one-dimensional) packet classifier of two rules as shown in Table 3 below.

TABLE 3

| Rule # | $F_1$ | Decision |
|---|---|---|
| 1 | 10** | accept |
| 2 | **** | discard |

Each of the non-terminal nodes at the same level of the graph as $v_2$ are handled in a similar manner. Thus, the subgraph rooted at node $v_3$ serves as the next minimization problem. In this case, a minimum packet classifier of one rule is derived as shown in Table 4 below.

TABLE 4

| Rule # | $F_1$ | Decision |
|---|---|---|
| 1 | **** | discard |

Figure 4:
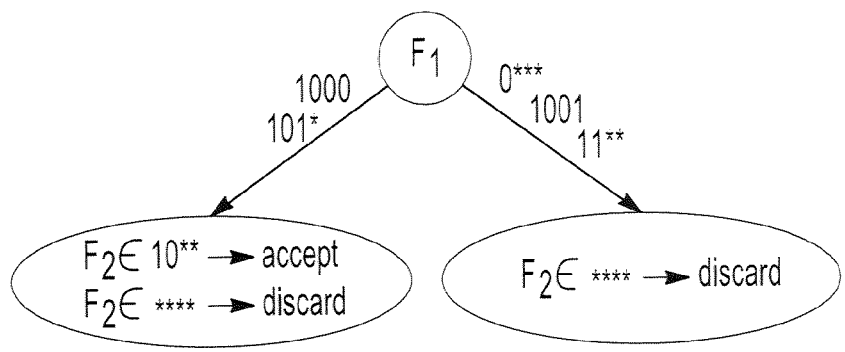
FIG. 4 is a diagram of a virtual one-dimensional packet classifier derived from FIG. 3.

Traversing the graph upward leads to root node $v_1$. As shown in FIG. 4, the subgraph rooted at $v_2$ is viewed as a decision with a multiplication factor or cost of 2, and the subgraph rooted at $v_3$ as another decision with a cost of 1. Thus, the graph rooted at $v_1$ can be thought of as a "virtual" one-dimensional packet classifier over field $F_1$, where each child has a multiplicative cost. The one-dimensional minimization algorithm described above is used to minimize the number of rules for this "virtual" one-dimensional packet classifier. The algorithm takes the following 5 prefixes and associated costs as input:

1000 (with decision $v_2$ and cost 2),
101* (with decision $v_2$ and cost 2),
0*** (with decision $v_3$ and cost 1),
1001 (with decision $v_3$ and cost 1),
11** (with decision $v_3$ and cost 1), Running the weighted one-dimensional TCAM minimization algorithm on the above input will produce the "virtual" one-dimensional packet classifier of three rules as shown in Table 5.

TABLE 5

| Rule # | $F_1$ | Decision |
|---|---|---|
| 1 | 1001 | go to node $v_3$ |
| 2 | 10** | go to node $v_2$ |
| 3 | **** | go to node $v_3$ |

Combining the "virtual" packet classifier in Table 5 and the two packet classifiers from Tables 3 and 4, yields a packet classifier of 4 rules as shown in Table 6.

TABLE 6

| Rule # | $F_1$ | $F_2$ | Decision |
|---|---|---|---|
| 1 | 1001 | **** | discard |
| 2 | 10** | 10** | accept |
| 3 | 10** | **** | discard |
| 4 | **** | **** | discard |

Redundant rules from the reduced packet classifier may be removed. In this example, rule $r_3$ in the packet classifier in Table 6 is redundant. If we remove rule $r_3$, all the packets that used to be resolved by $r_3$ (that is, all the packets that match $r_3$ but do not match $r_1$ and $r_2$) are now resolved by rule $r_4$, and $r_4$ has the same decision as $r_3$. Therefore, removing rule $r_3$ does not change the semantics of the packet classifier. Redundant rules in a packet classifier can be removed using various algorithms including one described by A. X. Liu and M. G. Gouda in "Complete redundancy detection in firewalls", In Proceedings of 19th Annual IFIP Conference on Data and Applications Security (DBSec), LNCS 3654, pages 196-209, 2005. Other types of algorithms for removing redundant rules also fall within the scope of this disclosure. After removing redundant rules, the reduced packet classifier derived from the FDD in FIG. 3 includes 3 rules.

To summarize, the method for constructing a packet classifier is comprised of the following four steps:

1) Convert a given packet classifier to an equivalent directed graph such as a FDD.
2) Apply a reduction algorithm to reduce the size of the FDD.
3) Generate a packet classifier from the FDD in a bottom up fashion. For every terminal node, assign a cost of 1. For a non-terminal node v with z outgoing edges $\{e_1, \ldots, e_z\}$, formulate a one-dimensional TCAM minimization problem as follows. For every prefix P in the label of edge $e_j$, ($1 \leq j \leq z$), set up the decision of P to be j, and the cost of P to be the cost of the node that edge $e_j$ points to. For node v, use the weighted one-dimensional TCAM minimization algorithm described above to compute a one-dimensional prefix packet classifier with the minimum cost. Then, assign this minimum cost to the cost of node v. Repeat the process for each non-terminal node in a given layer of the graph before continuing upward to the next layer in the graph until the root node is reached. After the root node is processed, generate a packet classifier using the prefixes computed at each node in a depth first traversal of the FDD. The cost of the root indicates the total number of prefix rules in the resulting packet classifier.
4) Remove all the redundant rules from the resulting packet classifier. The steps of the methodology described above are preferably implemented by computer executable instructions residing in a memory device and executed by a computer processor. It is to be understood that only the relevant steps of the methodology are discussed above, but that other computer executable instructions may be needed to control and manage the overall operation of the system. It is also understood that reducing the size of the directed graph and removing redundant rules are non-essential steps which may not be required. Finally, the resulting packet classifier is instantiated using techniques known in the art into a content-addressable memory.

Packet classification rules periodically need to be updated. The common practice for updating rules is to run two TCAMs in tandem where one TCAM is used while the other is updated. TCAM Razor is compatible with this current practice. Because TCAM Razor is efficient and the resultant TCAM lookup table is small, TCAM updating can be efficiently performed by rerunning TCAM Razor on the updated rules. When rules are frequently added to a classifier, following the lazy update strategy is suggested. First, after running TCAM Razor, store the resulting rules in the lower portion of the TCAM. Let n denote the total number of entries in the TCAM, m denote the total number of TCAM entries needed by a packet classifier after applying Razor, and let array T denote the TCAM. Initially, the m entries are stored from T[n−m] to T[n−1]. When a new rule r needs to be added to the classifier, perform range expansion on r. Let $m_1$ be the number of prefix rules that are created. Store these rules in locations T[n−m−$m_1$] to T[n−m−1]. As new rules are added, this process continues until the TCAM is filled up. Thus, TCAM Razor only needs to run periodically rather than when each new rule is added.

Two optimization techniques are discussed to reduce the running time and memory usage of TCAM Razor: lazy copying in FDD construction and hashing in FDD reduction.

Figure 5:
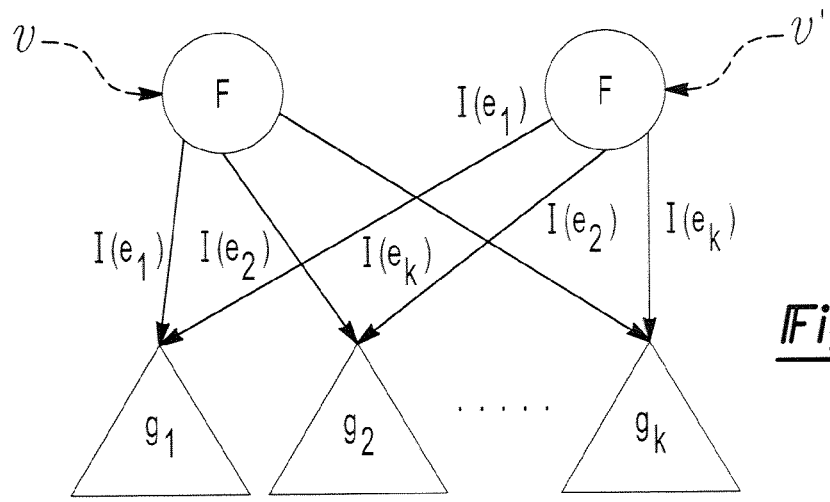
FIG. 5 is a diagram illustrating lazy copying of subgraphs.

The FDD construction algorithm noted above performs deep copying of subgraphs when splitting edges. This is inefficient in terms of both running time and memory usage. In TCAM Razor, the technique of lazy copying may be used, which is explained as follows. Consider the subgraph (of an FDD) in FIG. 5. The root of this subgraph is v, and v has k outgoing edges $e_1, e_2, \ldots, e_k$, which point to the subgraphs $g_1, g_2, \ldots, g_k$ respectively. When another copy of this subgraph needs to be made, instead of making a deep copy of the whole subgraph, only make another copy of the root of the subgraph. Let v' denote the new node. Node v' has the same label as v, and also has k outgoing edges $e'_1, e'_2, \ldots, e'_k$, where each $e'_i$ has the same label $I(e_i)$ as $e_i$, and also points to the same subgraph $g_i$ that $e_i$ points to.

Each time there is a need to modify a node v, first check its in-degree (i.e., the number of edges that point to v): if its indegree is 1, then directly modify v; if its indegree is greater than 1, then first make a lazy copy of the subgraph rooted at v, and then modify the new node v'. To the outside, lazy copying looks like deep copying, but it reduces unnecessary copying of subgraphs (and promotes the sharing of common subgraphs) in the constructed FDD as much as possible.

Figure 6:
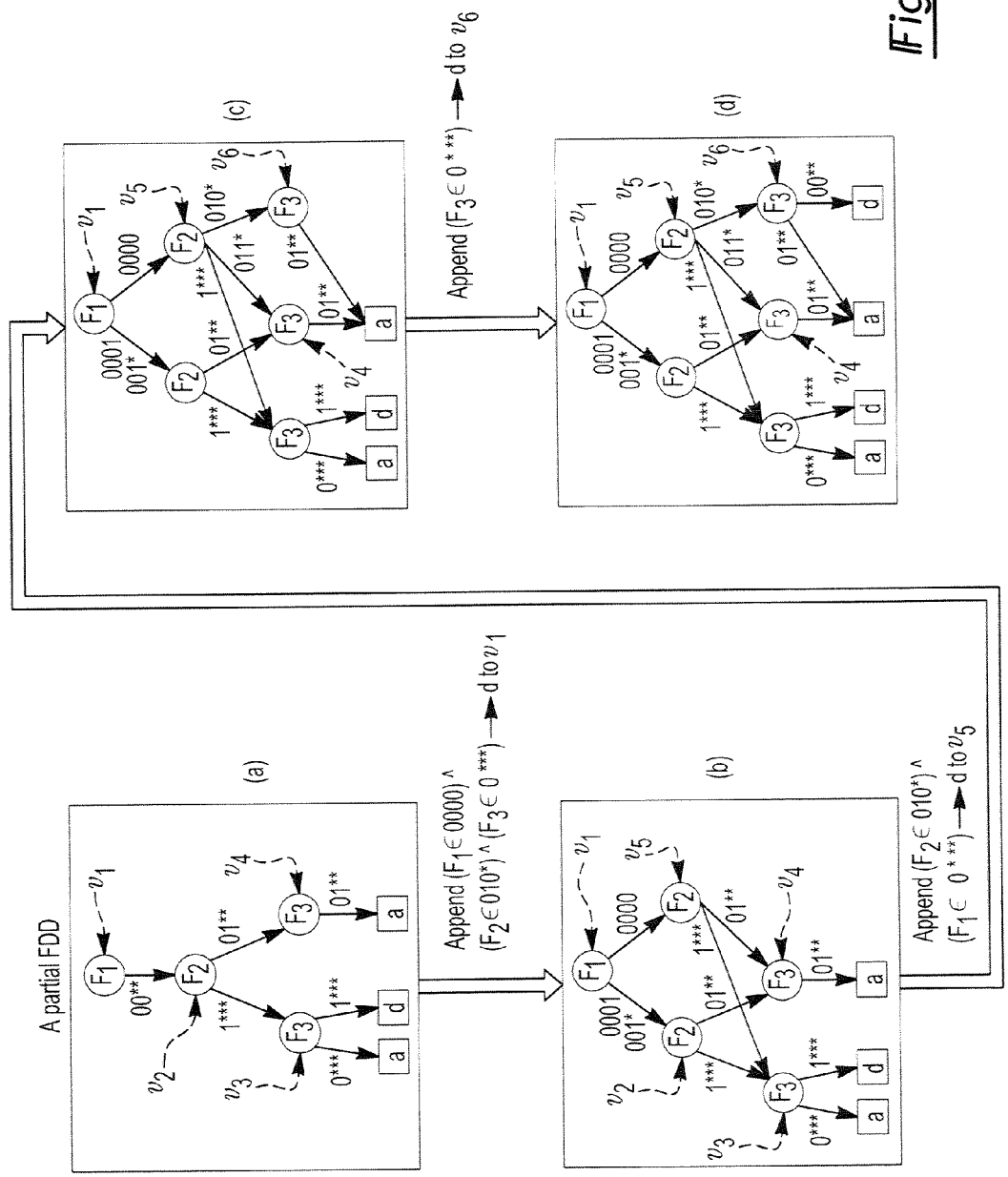
FIGS. 6A-6D illustrate an example of lazy copying in an improved FDD construction algorithm.
Figure 7:
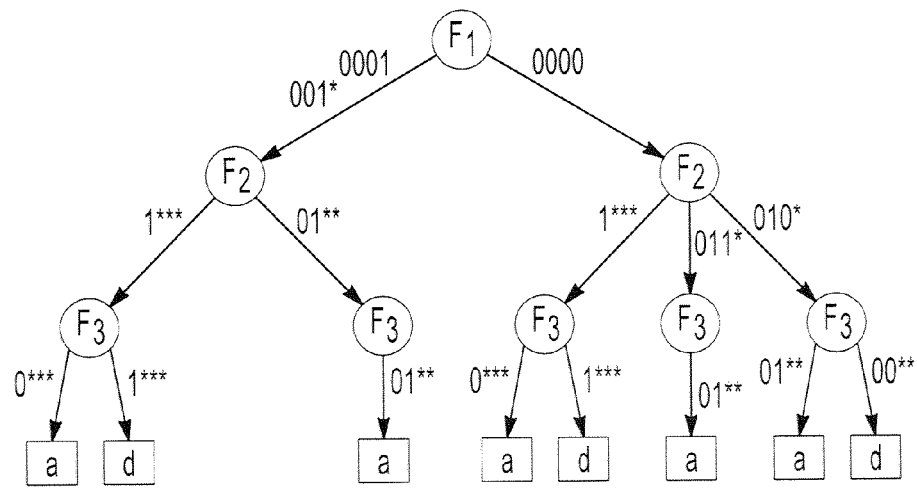
FIG. 7 is a diagram illustrating an example of deep copying in the original FDD construction algorithm.

FIG. 6 shows the process of appending rule $(F_1 \in 0000) \wedge (F_2 \in 010^*) \wedge (F_3 \in 0^{***}) \rightarrow d$ to node $v_1$ of the partial FDD in (a). A partial FDD is a diagram that has all the properties of an FDD except the completeness property. In contrast to FIG. 6(d), FIG. 7 shows the deep copying version of the partial FDD. The pseudocode for the lazy copying based FDD construction algorithm is in Algorithm 1 below.

---

Algorithm 1: Lazy Copying Based FDD Construction

---

Input: a packet classsifier f of a sequence of rules $\langle r_1, \ldots r_n \rangle$
Output: An FDD f' such that f and f' are equivalent 1) build a decision path with root v from rule $r_1$,
2) for i :=2 to n do APPEND(v, $r_i$);
3) APPEND(v, $F_m \in S_m$) $\wedge \ldots \wedge (F_d \in S_d) \rightarrow \langle dec \rangle$
   /*F(v)=$F_m$ and E(v)= $\{e_1 \ldots e_k\}$*/
4) if $(S_m - (I(e_1) \cup \ldots \cup I(e_k))) \neq \emptyset$ then
5)     add an outgoing edge $e_{k+1}$ with label $S_m - (I(e_1) \cup \ldots \cup I(e_k))$ to v;
6)     build a decision path from rule $(F_{m+1} \in S_{m+1}) \wedge \ldots \wedge (F_d \in S_d) \rightarrow \langle dec \rangle$, and make $e_{k+1}$ point to the first node in this path;
7) if m < d then
8)     for j:=1 to k do
9)       if $I(e_j) \subseteq S_m$ then
10)        if Indegree(Target($e_j$))>1 then
11)         (1) create a new node v' labeled the same as Target($e_j$);
12)         (2) let $e_j$ point to v';
13)         /*suppose Target($\varepsilon_j$) has h outgoing edges $\varepsilon_1, \varepsilon_2, \ldots \varepsilon_h$*/
14)         (3) create h new outgoing edges $\varepsilon_1', \varepsilon_2' \ldots, \varepsilon_h'$ for v' where each new edge $\varepsilon_t'$ point to Target ($\varepsilon_t$) for $1 \leq t \leq h$;
15)        APPEND(Target($e_j$), $(F_{m+1} \in S_{m+1}) \wedge \ldots \wedge (F_d \in S_d) \rightarrow \langle dec \rangle$);
16)       else if $I(e_j) \cap S_m \neq \emptyset$ then
17)        (1) create a new node v' labeled the same as Target ($e_j$);
18)        (2) create a new edge e from v to v' with label $I(e_j) \cap S_m$;
19)        (3) replace the label of $e_j$ by $I(e_j) - S_m$;
20)        /*suppose Target($\varepsilon_j$) has h outgoing edges $\varepsilon_1, \varepsilon_2, \ldots \varepsilon_h$*/
21)        (4) create h new outgoing edges $\varepsilon_1', \varepsilon_2' \ldots, \varepsilon_h'$ for v', where each new edge $\varepsilon_t'$ point to Target ($\varepsilon_t$) for $1 \leq t * h$;
22)        (5) APPEND (Target($e_j$), $(F_{m+1} \in S_{m+1}) \wedge \ldots \wedge (F_d \in S_d) \rightarrow \langle dec \rangle$);

---

To further reduce the number of rules generated by the algorithm, after converting a packet classifier to an equivalent FDD, the size of the FDD may be reduced. An FDD is reduced if and only if it satisfies the following three conditions: (1) no two nodes are isomorphic; (2) no two nodes have more than one edge between them; (3) no node has only one outgoing edge. Two nodes v and v' in an FDD are isomorphic if and only if v and v' satisfy one of the following two conditions: (1) both v and v' are terminal nodes with identical labels; (2) both v and v' are nonterminal nodes and there is a one-to-one correspondence between the outgoing edges of v and the outgoing edges of v' such that every pair of corresponding edges have identical labels and they both point to the same node.

Figure 8:
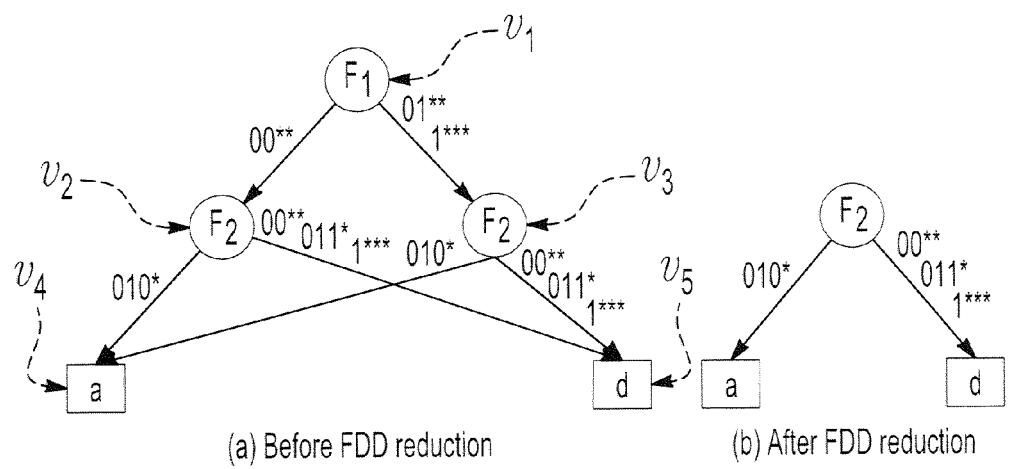
FIGS. 8A and 8B are diagrams illustrating an example of FDD reduction.

A motivating example is provided in which FDD reduction helps to reduce the number of prefix rules generated from an FDD. Consider the two equivalent FDDs in FIG. 8 where (a) is non-reduced and (b) is reduced. If we run the multidimensional TCAM minimization algorithm on the two FDDs in FIGS. 8A and 8B, we will produce 4 prefix rules as shown in Table 7 and 2 prefix rules as shown in Table 8, respectively.

TABLE 7

| Rule # | $F_1$ | $F_2$ | Decision |
|---|---|---|---|
| 1 | 00** | 010* | accept |
| 2 | 00** | **** | discard |
| 3 | **** | 010* | accept |
| 4 | **** | **** | discard |

TABLE 8

| Rule # | $F_1$ | $F_2$ | Decision |
|---|---|---|---|
| 1 | **** | 010* | accept |
| 2 | **** | **** | discard |

A brute force deep comparison algorithm for FDD reduction was proposed by M. G. Gouda and A. X. Liu in "Structured firewall design", Computer Networks Journal, 51(4): 1106-1120, March 2007. In TCAM Razor, a more efficient FDD reduction algorithm is used that processes the nodes level by level from the terminal nodes to the root node using signatures to speed up comparisons.

1) Starting from the bottom level, at each level, compute a signature for each node at that level. For a terminal node v, set v's signature to be its label. For a non-terminal node v, suppose v has k children $v_1, v_2, \ldots v_k$, in increasing order of signature ($Sig(v_i)<Sig(v_i+1)$ for $1 \leq i \leq k-1$), and the edge between v and its child $v_i$ is labeled with $E_i$, a sequence of non-overlapping prefixes in increasing order. Set the signature of node v as follows:

$$Sig(v) = h(Sig(v_1), E_1, \ldots, Sig(v_k), E_k)$$

where h is a one-way and collision resistant hash function such as MD5 and SHA-1. For any such hash function h, given two different input x and y, the probability of $h(x)=h(y)$ is extremely small.

2) After having assigned signatures to all nodes at a given level, search for isomorphic subgraphs as follows. For every pair of nodes $v_i$ and $v_j$ ($1 \leq i \neq j \leq k$) at this level, if $Sig(v_i) \neq Sig(v_j)$, then conclude that $v_i$ and $v_j$ are not isomorphic; otherwise, explicitly determine if $v_i$ and $v_j$ are isomorphic. If $v_i$ and $v_j$ are isomorphic, delete node $v_j$ and its outgoing edges, and redirect all the edges that point to $v_j$ to point to $v_i$. Further, eliminate double edges between node $v_i$ and its parents.

For example, the signatures of the non-root nodes in FIG. 8(a) are computed as follows:

$$Sig(v_4) = a$$

$$Sig(v_5) = d$$

$$Sig(v_2) = h(Sig(v_4), 010^*, Sig(v_5), 00^{**}, 011^*, 1^{***})$$

$$Sig(v_3) = h(Sig(v_4), 010^*, Sig(v_5), 00^{**}, 011^*, 1^{***})$$

At the end, for any nonterminal node v, if v has only one outgoing edge, remove v and redirect the incoming edge of v to v's single child. As this step does not affect the number of rules generated from the FDD, skip it in practice.

The effectiveness and efficiency of TCAM Razor is evaluated on both real-life and synthetic packet classifiers. Note that in cases where TCAM Razor cannot produce smaller packet classifiers than redundancy removal alone, TCAM Razor will return the classifier produced by redundancy removal. Thus, TCAM Razor always performs at least as well as redundancy removal.

First, define the metrics that are to be used to measure the effectiveness of TCAM Razor and the redundancy removal technique. In this paragraph, f denotes a packet classifier, S denotes a set of packet classifiers, and A denotes either TCAM Razor or the redundancy removal technique. Then, let |f| denote the number of rules in f, A(f) denote the prefix classifier produced by applying A on f, and Direct(f) denote the prefix classifier produced by applying direct range expansion on f Define the following four metrics for assessing the performance of A on a set of classifiers S.

The average compression ratio of A over $$S = \frac{\sum_{f \in s} \frac{|A(f)|}{|Direct(f)|}}{|S|}.$$

The total compression ratio of A over $$S = \frac{\sum_{f \in s} |A(f)|}{\sum_{f \in s} |Direct(f)|}.$$

The average expansion ratio of A over $$S = \frac{\sum_{f \in s} \frac{|A(f)|}{|f|}}{|S|}.$$

The total expansion ratio of A over $$S = \frac{\sum_{f \in s} |A(f)|}{\sum_{f \in s} |f|}.$$

First, define a set RL of 17 actual packet classifiers for performing experiments on. 42 actual packet classifiers were obtained from distinct network service providers that range in size from dozens to hundreds of rules. Although this collection of classifiers is diverse, some classifiers from the same network service provider have similar structure and exhibited similar results under TCAM Razor. To prevent this repetition from skewing the performance data, the 42 packet classifiers were divided into 17 structurally distinct groups, and one from each of the 17 groups was randomly chosen to form the set RL.

Figure 9:
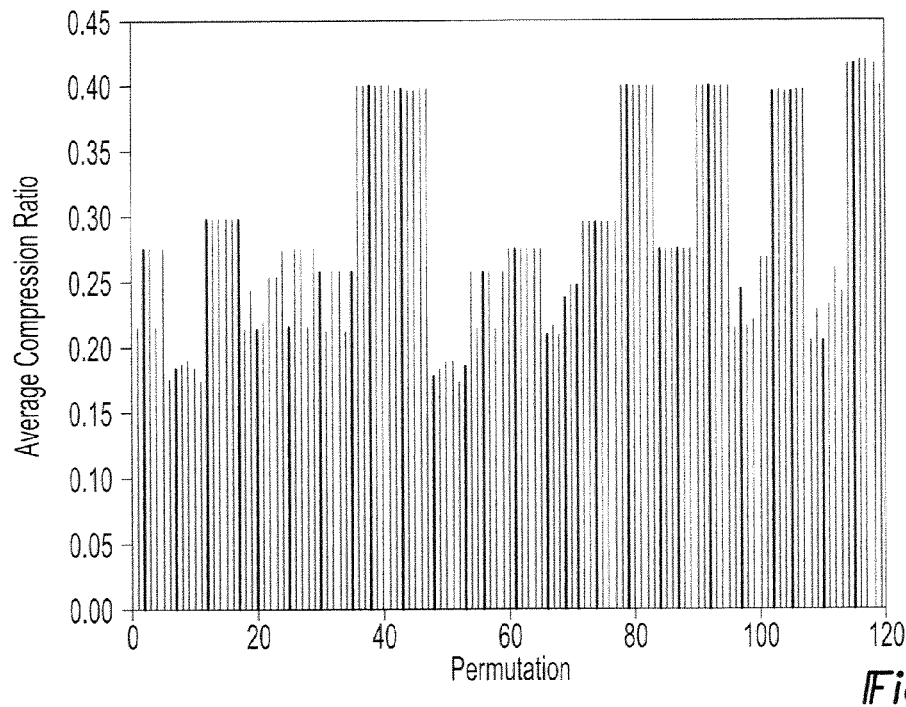
FIG. 9 is a chart illustrating average compression ratios for different permutations of an experimental packet classifier.

The variable order that is used to convert a packet classifier into an equivalent FDD affects the effectiveness of TCAM Razor. There are 5!=120 different permutations of the five packet fields (source IP address, destination IP address, source port number, destination port number, and protocol type). These permutations are numbered from 1 to 120, and the notation TCAM Razor(i) is used to denote TCAM Razor using permutation i, and for a given packet classifier f, use TCAM Razor(B) to denote TCAM Razor using the best of the 120 permutations for f A question that naturally arises is: which variable order achieves the best average compression ratio? To answer this question, for each permutation i, the average compression ratio that TCAM Razor(i) achieved over RL is computed. The results are shown in FIG. 9. The maximum average compression ratio is 41.8%. Furthermore, more than half of the permutations have average compression ratios below 29.1%, and four permutations have average compression ratios below 18.3%. Of these four permutations, permutation 49 (source IP address, protocol type, destination IP address, destination port number, source port number) is the best with an average compression ratio of 18.2%.

Figure 10:
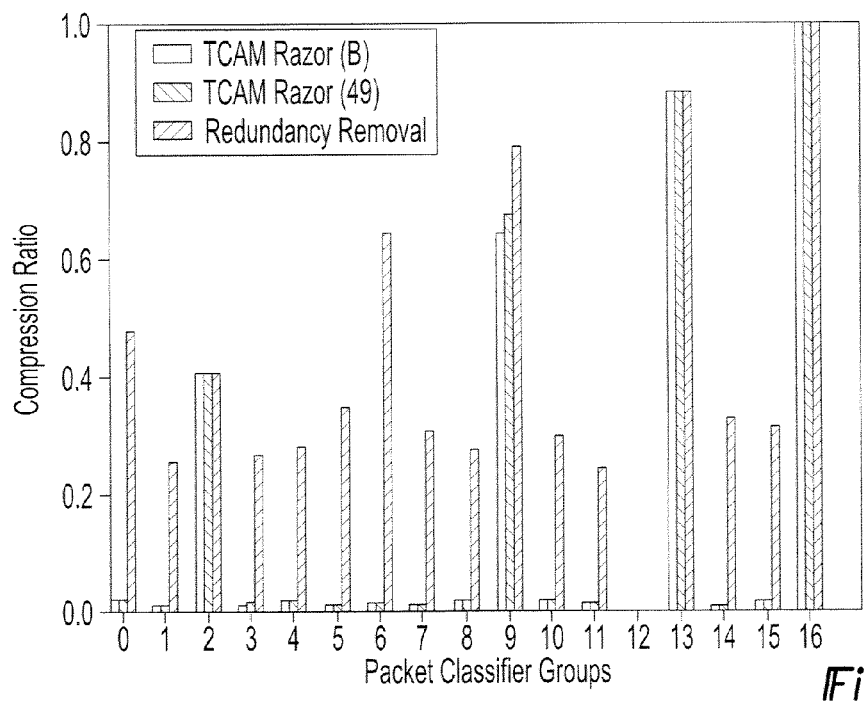
FIG. 10 is a chart illustrating compression ratios from actual packet classifiers.

The next natural question to ask is: is permutation 49 the best order for most packet classifiers? The answer for RL is yes. In FIG. 10, for each packet classifier in RL, the compression ratios of TCAM Razor(B), TCAM Razor(49), and redundancy removal are shown. The results show that permutation 49 achieves almost the best compression ratio for each packet classifier group.

Figure 11:
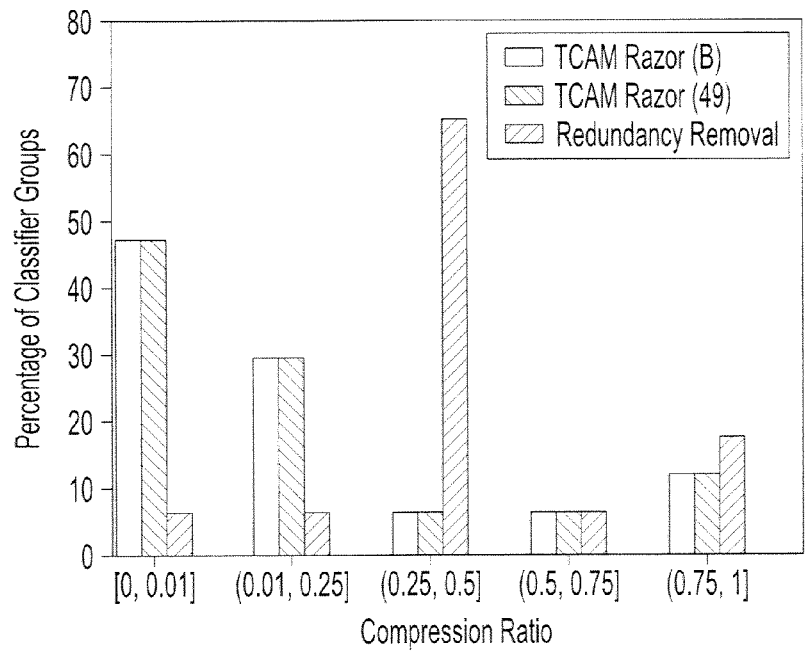
FIG. 11 is a chart illustrating distribution of actual packet classifiers by compression ratio.

Experimental results clearly demonstrate that TCAM Razor outperforms just redundancy removal. For example, the average compression ratios of TCAM Razor(49) and redundancy removal over RL are 18.2% and 41.8%, respectively. Similarly, the total compression ratios of TCAM Razor (49) and redundancy removal over RL are 3.9% and 35% respectively. FIG. 10 shows that TCAM Razor(49) significantly outperforms redundancy removal on 13 of the 17 real-life packet classifier groups. TCAM Razor(49) has a compression ratio of less than or equal to 1% on 8 of the 17 classifier groups in RL. FIG. 11 shows the distribution of compression ratios achieved by TCAM Razor and redundancy removal alone on RL.

Similar results are observed for expansion ratio. The average expansion ratios for TCAM Razor(49), redundancy removal, and direction range expansion over RL are 0.754, 19.877, and 69.870, respectively. The total expansion ratio for TCAM Razor(49), redundancy removal, and direct range expansion over RL are 0.797, 7.147, and 20.414, respectively.

Figure 12:
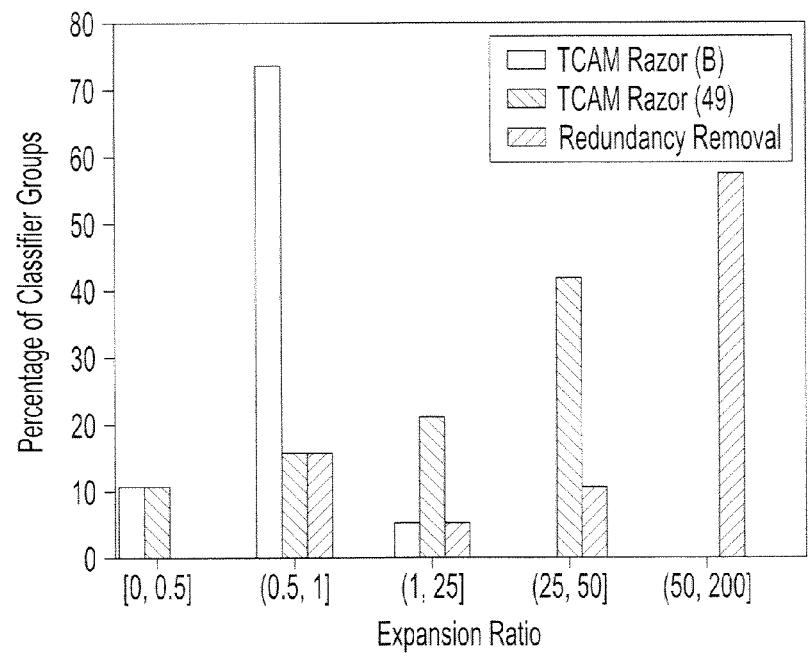
FIG. 12 is a chart illustrating distribution of actual packet classifiers by expansion ratio.

FIG. 12 shows the distribution of expansion ratios for the following three algorithms: TCAM Razor(49), redundancy removal, and direct range expansion. Range expansion is a real issue as over 60% of our packet classifiers have an expansion ratio of over 50 if direct range expansion is used. The experimental data also suggests that TCAM Razor addresses the range expansion issue well as TCAM Razor(49) has an expansion ratio of at most 1 on 16 of the 17 real-life packet classifier groups in our experiments, and TCAM Razor(49) has an expansion ratio of 1.07 on the 17th real-life packet classifier.

Packet classifier rules are considered confidential due to security concerns. Thus, it is difficult to get many real-life packet classifiers to experiment with. To address this issue and further evaluate the performance of TCAM Razor, a set of synthetic packet classifiers of 18 sizes, SYN, were generated, where each size has 100 independently generated classifiers.

Every predicate of a rule in the synthetic packet classifiers has five fields: source IP address, destination IP address, source port number, destination port number, and protocol type. First a list of values for each field was randomly generated. For IP addresses, a random class C address was generated; for ports a random range was generated; for protocols, a random protocol number was generated. Given these lists, a list of predicates was generated by taking the cross product of all these lists. A final default predicate was added to our list. Finally, one of two decisions, accept or deny, was randomly assigned to each predicate to make a complete rule.

Distributions of compression ratios and expansion ratios over SY N are shown in FIGS. 13 and 14. The average compression ratio of TCAM Razor(49) over SYN is 4.6%, the average expansion ratio of TCAM Razor(49) over SYN is 8.737, the total compression ratio of TCAM Razor(49) over SYN is 1.6%, and the total expansion ratio of TCAM Razor (49) over SYN is 3.082.

TCAMs have become the de facto industry standard for packet classification. However, as the rules in packet classifiers grow in number and complexity, the viability of TCAM-based solutions is threatened by the problem of range expansion. In this disclosed, a systematic approach to minimizing TCAM rules for packet classifiers is described (also referred to herein as TCAM Razor). While TCAM Razor does not always produce optimal packet classifiers, in our experiments with 17 structurally distinct real-life packet classifier groups, TCAM Razor reduced the number of TCAM entries needed by an average of 81.8% percent and a total of 96.1%. In fact, TCAM Razor experienced no expansion for 16 of the 17 real-life packet classifier groups. Finally, unlike other solutions that require modifying TCAM circuits or packet processing hardware, TCAM Razor can be deployed today by network administrators and ISPs to cope with range expansion.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:
1. A method for constructing a packet classifier for a computer network system, comprising:
representing a set of input rules for packet classification as a directed graph, where an input rule sets forth values for fields in a data packet and a decision for data packets having matching field values;

traversing the directed graph in a bottom up manner from terminal nodes towards a root node of the directed graph;

partitioning the directed graph into a plurality of subgraphs, where each subgraphs extends from non-terminal nodes in the directed graph and represent a minimization problem, thereby forming a set of minimization problems;

assigning a cost to each edge extending from a given non-terminal node, where each edge terminates at a child node of the given non-terminal node and the cost assigned to an edge correlates to the number of rules associated with its child node;

solving the set of minimization problems using dynamic programming to yield a minimal set of rules that are distinct from the set of input rules;

removing redundant rules from the minimal set of rules;

instantiating the minimal set of rule in a content-addressable memory device; and routing data packets in the computer network system using the packet classifier in the content-addressable memory device.

2. The method of claim 1 further comprises reducing size of the directed graph prior to formulating the plurality of minimization problems.

3. The method of claim 2 further comprises reducing the size of the directed graph by merging isomorphic subgraphs therein.

4. The method of claim 1 further comprises representing the set of input rules as a firewall decision diagram.

5. The method of claim 1 further comprises assigning a cost of one to each terminal node in the directed graph.

6. A method for constructing a packet classifier for a computer network system, comprising:

representing a set of rules for packet classification as a directed graph, where a rule sets forth values for fields in a data packet and a decision for data packets having matching field values;

partitioning, by a computer processor, the graph into two or more subgraphs, where each subgraph extending from non-terminal nodes in the directed graph and represent a one-dimensional packet classifier such that a root node of a given subgraph represents a field of the corresponding one-dimensional packet classifier;

assigning, by the computer processor, for each subgraph, a cost to each edge in the subgraph, where each edge terminates at a child node of a given non-terminal node in the subgraph and the cost assigned to an edge correlates to the number of rules associated with its child node;

computing, by the computer processor, for each subgraph, a one-dimensional packet classifier having a minimum cost;

combining, by the computer processor, the packet classifiers having a minimum cost to form a reduced packet classifier; and instantiating the reduced packet classifier in a content-addressable memory device.

7. The method of claim 6 further comprises reducing size of the directed graph prior to partitioning the graph.

8. The method of claim 7 further comprises reducing the size of the directed graph by merging isomorphic subgraphs therein.

9. The method of claim 6 further comprises representing the set of rules as a firewall decision diagram.

10. The method of claim 6 further comprises computing a one-dimensional packet classifier using dynamic programming.

11. The method of claim 6 further comprises removing redundant rules from the reduced packet classifier prior to instantiating the reduced packet classifier in a content-addressable memory device.

12. A method for minimizing a packet classifier for a computer network system, comprising:

representing a set of rules for packet classification as a directed graph, where a rule sets forth values for fields in a data packet and a decision for data packets having matching field values;

assigning, by a computer processor, a cost of one to each terminal node in the directed graph;

traversing, by the computer processor, the directed graph in a bottom up manner from the terminal nodes towards a root node of the directed graph and formulating a minimization problem for each non-terminal node in the directed graph;

assigning, by the computer processor, a cost to each edge extending from a given non-terminal node and solving the minimization problem for the given non-terminal node using the costs assigned to the edges, where each edge terminates at a child node of the given non-terminal node and the cost assigned to an edge correlates to the number of rules associated with its child node;

combining, by the computer processor, solutions from the minimization problems to yield a reduced set of rules which form a reduced packet classifier; and instantiating the reduced packet classifier in a content-addressable memory device.

13. The method of claim 12 further comprises instantiating the reduced packet classifier in a content-addressable memory device having a ternary content addressable memory.

14. The method of claim 12 further comprises reducing size of the directed graph prior to traversing the directed graph.

15. The method of claim 14 further comprises reducing the size of the directed graph by merging isomorphic subgraphs therein.

16. The method of claim 12 further comprises representing the set of rules as a firewall decision diagram.

* * * * *

UNITED STATES PATENT AND TRADEMARK OFFICE
CERTIFICATE OF CORRECTION

PATENT NO. : 8,654,763 B2
APPLICATION NO. : 12/578824
DATED : February 18, 2014
INVENTOR(S) : Liu et al.

It is certified that error appears in the above-identified patent and that said Letters Patent is hereby corrected as shown below:

In the Specification

| | |
|---|---|
| Column 3, line 16 | Delete "ratio" and insert --ratio.--. |
| Column 5, line 20 | Delete "off" and insert --of f,--. |
| Column 7, line 61 | Delete "$(f\frac{d_y}{P})$" and insert --$C(f\frac{d_y}{P})$--. |
| Column 8, line 65 | Delete "V" and insert --"d"--. |
| Column 8, line 66 | Before "an" insert --$f_1$,--. |
| Column 11, line 49 | Delete "$e_1'''$" and insert --$e'_1$--. |
| Column 12, line 21 | Delete "$I(e_j$" and insert --$I(e_j)$--. |
| Column 12, line 25 | Delete "$\varepsilon_j$" and insert --$(e_j)$--. |
| Column 12, line 37 | Delete "$\varepsilon_j$" and insert --$(e_j)$--. |
| Column 12, line 40 | Delete "$1 \leq t * h$" and insert --$1 \leq t \leq h$;--. |
| Column 14, line 9 | Delete "on f" and insert --on f.--. |
| Column 14, line 63 | Delete "f" and insert --f.--. |

Signed and Sealed this
Twenty-third Day of September, 2014

Michelle K. Lee
*Deputy Director of the United States Patent and Trademark Office*